United States Patent

Khalemsky et al.

[11] Patent Number: 6,077,416
[45] Date of Patent: Jun. 20, 2000

[54] METHOD FOR PURIFICATION OF WASTE WATER USING AN ELECTRIC COAGULATOR

[76] Inventors: Aron Mikhailovich Khalemsky, 84-4, Karl Libknecht Str., Revda, 623270; Sergei Abramovich Payusov, 118, Lunacharsky Str, Ekaterinburg, 620219; Anatoly Grigorievich Talanov, 25, Mira Street; Yuri Nikolaevich Yurkov, 32, Lenin Street, both of Revda, Ekaterinburg Region, 623270, all of Russian Federation

[21] Appl. No.: 09/005,184

[22] Filed: Jan. 9, 1998

[30] Foreign Application Priority Data

Jan. 10, 1997 [RU] Russian Federation .......... 2071449C1

[51] Int. Cl.$^7$ ...................................... C02F 1/46
[52] U.S. Cl. .................... 205/761; 204/554; 204/571; 204/668; 204/669; 205/755; 205/758
[58] Field of Search .................... 204/554, 571, 204/668, 669; 205/742, 755, 758, 761

[56] References Cited

U.S. PATENT DOCUMENTS

| | | | |
|---|---|---|---|
| 1,726,236 | 8/1929 | Parker | 205/480 |
| 2,903,402 | 9/1959 | Fromm, Jr. | 205/46 |
| 4,048,031 | 9/1977 | Valanti | 205/761 |
| 4,304,648 | 12/1981 | Vellas | 205/755 |
| 4,329,211 | 5/1982 | Plantes et al. | 205/755 |
| 4,690,741 | 9/1987 | Walsh, III et al. | 205/688 |

OTHER PUBLICATIONS

The Condensed Chemical Dictionary, Seventh edition, Reinhold Book Corp., New York, p. 361, 1968 month of publication not available.

*Primary Examiner*—Kathryn Gorgos
*Assistant Examiner*—William T. Leader
*Attorney, Agent, or Firm*—Michael J. Foycik, Jr.

[57] ABSTRACT

The invention relates to purification of waste waters and may be used for water purification from heavy non-ferrous metals, chrome and organic impurities, as well as for separation of impurities from solution. The method is performed by electric coagulation with 3-phase alternating current having a current density of at least 3.0 A/dm2 using a coagulator that is provided with at least one mobile electrode disposed between at least two immobile electrodes.

1 Claim, 1 Drawing Sheet

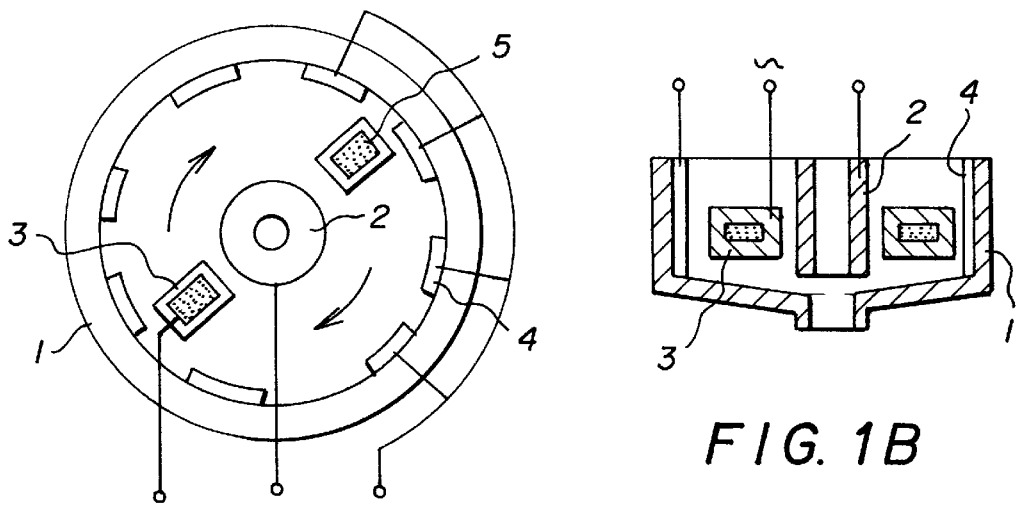
FIG. 1A
FIG. 1B
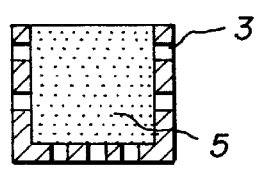
FIG. 1C
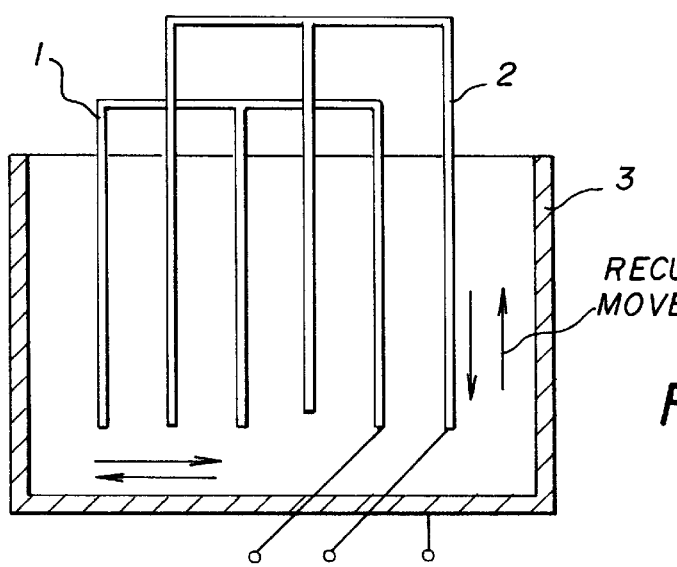
FIG. 2
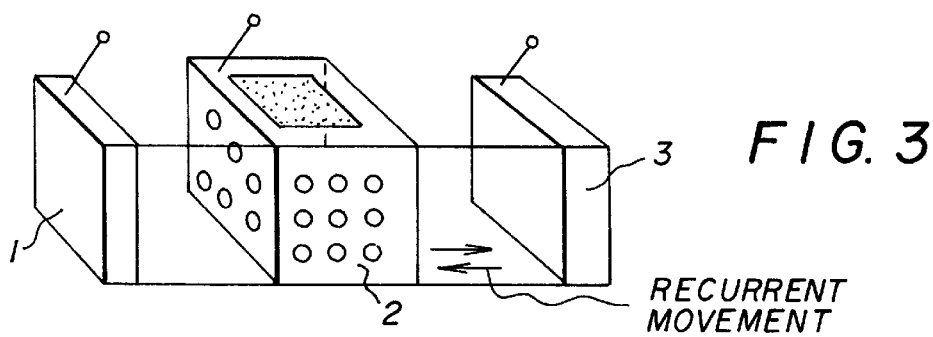
FIG. 3

METHOD FOR PURIFICATION OF WASTE WATER USING AN ELECTRIC COAGULATOR

This invention relates to purification of waste waters and may be used for purification of water from heavy non-ferrous metals and chrome, organic impurities, as well as for purification of different solutions from impurities in small quantities.

Well-known is the method of purification of waste waters from foulings by electric coagulation using constant current with superimposed of AC with frequency of 45–50 Hz aiming at partial elimination of drawbacks of constant current coagulation.

However, this method is unfit for waste water purification from most organic impurities, since constant current does not decompose organic substances.

The closest to the claimed technical solution is the method of purification of waste waters from petroleum. This method comprises purification of waste waters from petroleum by means of electric coagulation using unbalanced alternating current with various duration of positive and negative pulses.

The drawback of this method is the necessity of the installation of a special generator to work out unbalanced current with a determined value of positive and negative pulses. This fact complicates significantly the apparatus arrangement of the process and increases unproductive energy expenses.

The task, which solution the claimed invention is aimed at, is to increase the degree of waste water purification, to reduce energy expenses for carrying out the process and to extend the range of separated impurities.

To solve the stated task in the method comprising purification of waste water by means of electric coagulation with the use of alternating current, according to the invention, immobile and mobile electrodes are used and the process is performed with current density not less than 3.0 A/dm$^2$.

The above-mentioned features specifying the proposed technical solution are substantial and provide the complex purification of technological liquids and waste waters from various substances.

The specific feature of the claimed method is its performance with the use of mobile electrodes with current density not less than 3.0 A/dm$^2$.

Mobile electrodes are made of aluminum and duralumninum as well as single-polar electrodes of low-grade steel.

Mobile electrodes create an electric field of alternating intensity and balance, due to which the following reactions intensifying the higher degree of purification are performed, namely:

1. Electrochemical reduction relating to those cations and anions which electrode or redox-potential is lower on its absolute value than that of aluminum.
2. Electrochemical decomposition of polar organic molecules unstable in an alternating field.
3. Composition of unsoluble ferrous alumlinates and aluminum and ferrum hydroxo-salts like $FeAl_2O_4$ and $Al(OH)SO_4$, $Al(OH)_2Cl$ and co-sedimentation of heavy metals, for example, copper like $CuAl_2O_3$, chrome like $FeCr_2O_4$ and acid residues.
4. Complex composition with ferrum and co-sedimentation of organic substances and their residues (radicals, i.e. substances resulting from electrochemical decomposition—R) like $[Fe(R_6)]Cr_2O_4$ or $Fe(R_6)OOH$.
5. Ionization of fine-crystallic compounds by ions of $Al^{3+}$ and their coalescence with further sedimentation.
6. Coagulation of sediments.
7. Adsorbtion of non-decomposed substances on well-developed surfaces of ferrum-aluminum hydroxide with their further sedimentation (abnormal mixing).

Besides, the mobile electrodes provide the mechanical mixing of purified liquid, and thus intensify the purification process.

The necessary condition to start the reaction is the required value of current density on the electrodes, it should be not less than 3.0 A/dm$^2$. The lower value of current density on the electrodes does not provide sufficient energy for the start of the reaction on the electrodes. Increase of current density value for more than 3.0 A/dm$^2$ is reasonable only if the economic effect of purification covers energy expenses.

Performance of the claimed method is explained with illustrations, showing some schemes of electrode movements dependent on the quality and type of separated impurities.

BRIEF DESCRIPTION OF THE DRAWINGS

FIGS. 1A, 1B, and 1C shows movements of electrodes during purification of waste water from heavy metals and chrome;

FIG. 2 shows the scheme of electrode movements in the process of purification of caustic natrium from chrome;

FIG. 3 shows a scheme of electrode movements in the process of purification of washing waters from organic impuruties.

The method is carried out as follows.

Waste waters are processed in a tank which is manufactured of different materials depending on the composition of an initial solution. Mixing and purification of the solution is carried out by mobile electrodes mounted in the tank.

EXAMPLE 1

Waste waters from a copper melting plant are purified from impurities of heavy non-ferrous metals by use of mobile electrodes according to the scheme presented in FIGS. 1A, 1B, 1C. Processing is carried out with the following parameters: three-phased alternating current with a frequency of 50 Hz and voltage of 380 V. Null phase is applied on the mobile electrode 3, manufactured in the form of a perforated container made of aluminum or duraluminum, filled with iron-aluminum shaving 5, in proportion 1:1 by volume.

Immobile cylinder electrode 2 made of aluminum or duralumin is mounted in the center of concrete tank 1. Immobile electrodes 4 made of steel are placed along the perimeter of the tank and are manufactured in a form of blocks of any profile (used beams, tubes, channels, corners, T-rails, etc.) All periphery steel electrodes are electrically connected with each other. The lowest acceptable density of current on the mobile electrode—3 A/dm$^2$, the mobile electrode rotates at the speed 1 r.p.m.

Results of purification (copper, for example) are shown in table 1.

EXAMPLE 2

A solution of caustic natrium at a concentration of 150 g/l fouled with impurity of hexavalent chrome is being purified.

The purificatin is carried out with the use of mobile electrodes according to the scheme shown in FIG. 2. Current is alternating, 3-phased frequency is 50 Hz, voltage is 380 V. Null phase is applied on metal tank 3. The electrode system is produced as packet of immobile electrodes 1, inside of which packet of electrodes commits recurrent movement. Electrodes in packets have parallel connections, one packet is made of aluminum or duralumin (2), another of steel (1). Recurrent movement is commited at a speed of 1 vibration in a minute. Space between electrodes in each packet is 20 mm, maximum close position of electrodes from different packets is 15 mm. The process is carried out at minimum density of current of 3 $A/dm^2$.

EXAMPLE 3

The washing (technical) water from metal-cutting machine tools is cleaned of organic admixtures—remains of cooling emulsion. Electrodes are placed according to the scheme shown in FIG. 3. Mobile electrode 2 is manufactured in the form of a perforated container, filled with iron-aluminum shaving.

Immobile electrodes are made of steel (1) and aluminum or duralumin (3). The mobile electrode commits recurrent-progressive movement. The purification is carried out with the use of 3-phased current and voltage of 380 V and frequency of 50 Hz. Minimal density of current is 5 $A/dm^2$. Results of purication of waste waters with different content of impurities are shown in table 1.

For comparison in all examples, results of purification of the same solutions according to the method but with fixed immobile electrodes are shown. With the data of table 1 it is clear that the degree of purification according to the proposed method is increased in 5–10 times.

To compare energy expenses and productivity, research has been undertaken at optimal regimes of purification with the use of mobile and immobile electrodes. Comparison data shown in table 2 means that energy expenses in the course of purification with the method proposed are decreased by more than 3 times, and duration of the process by 3–20 times.

Merit of the proposed method are:

possibility of purification of waste waters from different impurities including organic, dividing of technological solutions, separation one substance from another, use of alternating current of industrial standard frequency in the process of purification.

TABLE 1

| Example 1 Copper content in M.A.C.* | | | Example 2 Chrome content in M.A.C. | | | Example 3 Organic submix content in M.A.C. | | |
| --- | --- | --- | --- | --- | --- | --- | --- | --- |
| in initial liquid | after clearing with mobile electrodes | after clearing with stationary electrodes | in initial liquid | after clearing with mobile electrodes | after clearing with stationary electrodes | in initial liquid | after clearing with mobile electrodes | after clearing with stationary electrodes |
| 16.9 | 0.98 | 10.0 | 8 | traces | 1.0 | 3 | 1.0 | 3.0 |
| 13.0 | 1.09 | 5.2 | 9 | " | 1.0 | 5 | 1.0 | 3.0 |
| 7.0 | 0.82 | 3.0 | 10 | " | 1.2 | 7 | 1.0 | 3.5 |
| 6.0 | 0.90 | 3.3 | 11 | " | 0.9 | 8 | 1.0 | 6.0 |
| 4.0 | 0.78 | 2.4 | 12 | " | 1.1 | 9 | 0.2 | 6.0 |
| 2.6 | 0.79 | 1.9 | | | | | 0.7 | 8.5 |
| 1.3 | 0.84 | 1.1 | | | | 10 | 1.0 | 10.0 |
| | | | | | | 11 | 1.0 | 10.0 |
| | | | | | | 12 | 0.7 | 10.0 |
| | | | | | | 16 | | |

*M.A.C. - max. allowed content in $mg/m^3$:
Copper - 13.0;
Chrome - 0.1;
Organic substances - 0.1.

TABLE 2

| | | Energy consuming | | Duration of clearing, hrs | |
| --- | --- | --- | --- | --- | --- |
| Initial substances | measurement unit | method being declared | with stationary electrodes | method being declared | with stationary electrodes |
| Clearing waste water of copper (0.017–0.220) | kW/kg of copper | 20.0 | 62.0 | 0.5 | 0.5–3.6 |
| Clearing NaOH of chrome (257–2143 $g/m^3$) | kW/kg of chrome | 19.0 | 51.1 | 0.5 | 0.7–1.5 |
| Clearing initial liquid in $CH_4OOK$ production of carbonised sulfer (0.006–0.013 $g/m^3$) | $kW/m^3$ | 0.9–2.5 | 3.5–7.0 | 0.5 | 1.5–2.5 |
| Clearing cleaning water of cooling emulsion (0.3–1.6 $g/m^3$) | $kW/m^3$ | 0.7–3.5 | 2.24–50.1 | 0.5 | 2.0–10.0 |

What is claimed is:

1. In a method for the purification of waste water comprising the steps of providing an electric coagulator with at least two immobile electrodes, introducing the waste water into the coagulator, and applying alternating current to the electrodes to treat the water, the improvement comprising providing at least one mobile electrode disposed between the immobile electrodes, and utilizing 3-phased alternating current at a frequency of 50 Hz or 60 Hz and a current density which is at least 3.0 A/dm$^2$, wherein the immobile electrodes are made of a material selected from the group consisting of steel, aluminum and duraluminum, and at least one of the immobile electrodes is steel and at least one of the immobile electrodes is aluminum or duraluminum, and the mobile electrode or electrodes are made of a material selected from the group consisting of aluminum and duraluminum.

* * * * *